Figure 1:
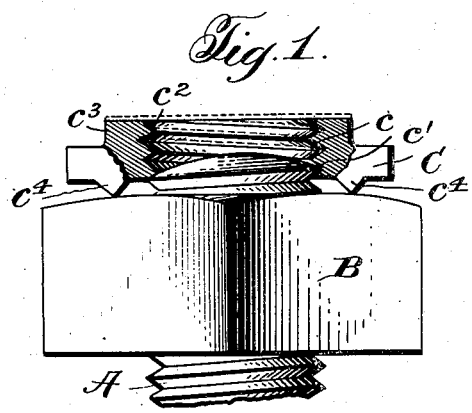

D. O. WARD, DEC'D.
N. L. WARD, ADMINISTRATRIX.
SELF LOCKING NUT AND PROCESS OF MAKING THE SAME.
APPLICATION FILED JAN. 19, 1912.

1,077,022.

Patented Oct. 28, 1913.

Witnesses:
Jas. E. Hutchinson
Gertrude Wedemeier

Inventor:
Daniel O. Ward
By Jacob Milans Attorney

UNITED STATES PATENT OFFICE.

DANIEL O. WARD, OF OAK PARK, ILLINOIS; NELLIE LEE WARD ADMINISTRATRIX OF SAID DANIEL O. WARD, DECEASED.

SELF-LOCKING NUT AND PROCESS OF MAKING THE SAME.

1,077,022.  Specification of Letters Patent.  Patented Oct. 28, 1913.

Application filed January 19, 1912. Serial No. 672,197.

*To all whom it may concern:*

Be it known that I, DANIEL O. WARD, a citizen of the United States, residing in Oak Park, in the county of Cook and State of Illinois, have invented certain new and useful Improvements in Self-Locking Nuts and Processes of Making the Same, of which the following is a specification.

This invention relates to an improvement in nut locks and more particularly to nut locks including a self-locking nut having helical thread portions extending in parallel relation and located at unequal or different distances from each other, or in such position and relation to each other as to form valleys or groove portions of different widths and parallel to each other and adapted to admit a screw thread or threads of a bolt to be engaged by the thread or threads of the nut so as to secure or lock the same upon the bolt.

One of the objects of the present invention is to provide an improved device of this character which is simple, economical to manufacture, and efficient in construction and operation.

A further object of the present invention is the provision of a device of this character of such a construction as to enable the same to be made in a practical manner and in commercial quantities with helical screw thread portions extending in parallel relation to each other and located at unequal or different distances from each other for securing or locking the nut or nut locking member upon a bolt and with other helical or screw threaded portions located at equal or uniform distances from each other and adapted to turn with comparative freedom upon the screw thread or threads of a bolt until the bolt thread comes into engagement with the unequally spaced parallel thread portions of the nut.

A further object of the present invention is the provision of a nut lock comprising a main nut and a cap nut, one of said nut members being provided with parallel helical threaded portions unequally spaced and one of said nut members being provided with means projecting from the base thereof outside of the threaded aperture therein, whereby when the nut members are brought together upon a bolt, the cap nut will be bowed so as to effectively lock the same upon the bolt.

Other objects of the present invention will be apparent from the detailed description hereinafter when read in connection with the accompanying drawings forming a part hereof wherein a convenient embodiment of the invention is illustrated and wherein like characters of reference refer to similar parts in the several views.

Figure 2:
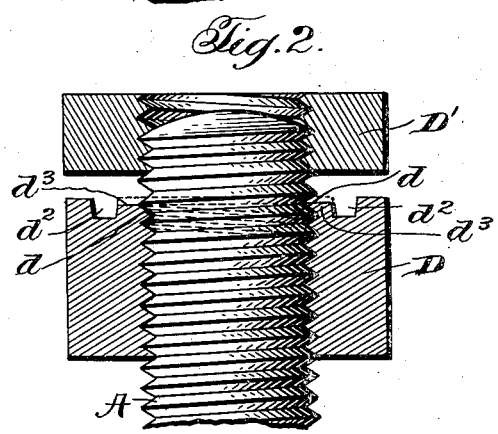
Figure 3:
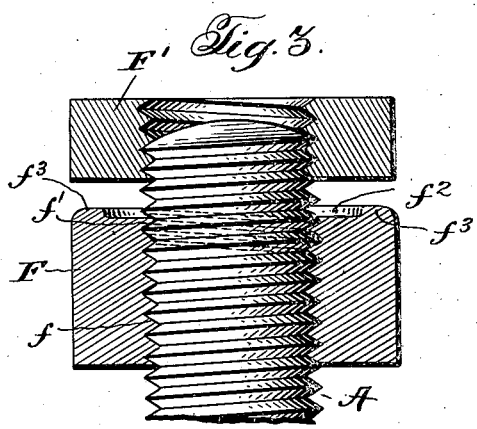

In the drawings:—Figure 1 is a side elevation of the improved nut lock, parts being shown in section; Fig. 2 is a longitudinal section of a slightly modified form of the invention, the invention in this instance comprising a specially formed self-locking nut and a cap nut adapted to coöperate therewith; and Fig. 3 is a longitudinal section of another modified form of the invention, the device in this instance also comprising a specially formed lock nut and a cap nut adapted to coöperate therewith.

Referring now more particularly to the form of the invention shown in Fig. 1, A designates a threaded bolt of any well known construction upon which is threaded the ordinary nut B, an improved self-locking cap nut C being threaded upon the bolt above the ordinary nut B. In the embodiment of the invention illustrated in this figure, the cap nut C is provided with a threaded opening $c$ through the central portion thereof, the lowermost threads of which comprise uniformly spaced parallel thread portions $c'$ and the uppermost threads of which comprise thread portions $c^2$ which are closer together than the uniformly spaced thread portions $c'$ heretofore referred to. In the embodiment of the invention illustrated the peculiarly fashioned thread of the cap nut C is conveniently formed by providing the upper surface of said cap nut with an upwardly extending boss $c^3$ which surrounds the thread opening therein and a helical thread is first formed in the thread opening, all of the thread portions of which are uniformly spaced. The boss $c^3$ is then compressed longitudinally of the thread opening in the nut or parallel to the axial center of the nut, thus bringing the helical thread portions which extend through the boss closer together than the uniformly spaced thread portions of the main body of the nut which will not be disturbed by such compressing operation, the boss or projection $c^3$ being of less area or smaller in cross section than the main body portion of the nut. The cap nut C is provided on its underside with downwardly extending projections $c^4$ which conveniently extend transversely of the nut, and are provided with sharpened lower edges.

In the use of the device as above described the cap nut C is threaded onto the bolt above the ordinary nut and into engagement therewith, and is locked in its adjusted position by reason of the engagement of the threads of the bolt with the closely spaced locking threads in the upper portion of the cap nut. As the cap nut is screwed home onto the main nut, the ribs $c^4$ which project from the underside of the cap nut will be caused to bite into the surface of the main nut and thus lock the cap nut in fixed relation to the main nut. Furthermore, as the cap nut is screwed home and the transverse ribs $c^4$ thereof are caused to engage the main nut, the body of the cap nut will be slightly bowed so that the threads thereof will be caused to more firmly engage the threads of the bolt.

In Fig. 2 of the drawing the device comprises a main nut D which is provided with a threaded aperture extending therethrough, the upper portions of the thread of said aperture comprising thread portions $d$ which are positioned closer to each other than the remainder of the thread, and a cap nut D' which is adapted to be used in conjunction with said main nut, said main nut being so fashioned that as the cap nut is screwed downwardly thereon, it will be bowed slightly thus causing the threads thereof to be moved into locking engagement with the threads of the bolt.

In the form of the invention disclosed in Fig. 2 the nut D is formed by providing a channel $d^2$ in the upper surface thereof intermediate the outer edge thereof and the thread opening thereof, threading the thread opening in the usual manner, and then compressing longitudinally the portion of the nut which is inclosed by the groove $d^2$ so as to form the locking threads $d$. The portion of the nut which is thus compressed is positioned below the plane of the portion of the nut which is positioned outside of the groove $d^2$, so that there is, in effect, formed an upwardly extending flange $d^3$ around the outer portion of the bolt, and as the cap nut D' is screwed home it will be seen that it will, by reason of its engagement with the flange $d^3$, be slightly bowed and thereby locked upon the bolt.

The construction shown in Fig. 3 is somewhat similar to that shown in Fig. 2, a nut F being utilized which is provided with a threaded bolt opening centrally thereof, the threading of which comprises uniformly spaced thread portions $f$ in the main body portion of the nut and thread portions $f'$ in the upper portion of the nut which are spaced closer together than the thread portions $f$. In the embodiment of the invention illustrated in the figure, the nut F is formed by providing a blank with the usual threaded opening and compressing the upper portion of the blank immediately surrounding the thread opening therein, to form the locking threads $f'$. Compressing the blank in this manner forms a recess $f^2$ in the upper surface of the nut around the thread opening therein which results in forming an upwardly projecting peripheral portion $f^3$. A cap nut F' of the ordinary construction is adapted to be used in conjunction with the nut F. When the cap nut F' is screwed home into the main nut F it will, by reason of its engagement with the peripheral portion $f^3$ be slightly bent or bowed, and thus locked in its adjusted position on the bolt.

While a convenient embodiment of the invention is illustrated in the accompanying drawings, it will be understood that many changes may be made to the forms therein shown without departing from the spirit and scope of the invention as defined in the appended claims.

I claim:

1. A self-locking nut comprising in its construction a body having a bolt-receiving aperture, and provided with helical thread portions located at unequal distances from each other and adapted to engage the helical thread of a bolt, and transverse sharp projecting edges on one face of the body, adapted to engage a nut and hold the same in fixed relation to the self-locking nut.

2. A self-locking nut comprising in its construction a body having a bolt-receiving aperture, and provided with a helical thread portion encircling the aperture and consisting of uniformly spaced convolutions, and another helical thread portion located closer to said first mentioned helical thread portion than the uniformly spaced convolutions are to each other, for holding said self-locking nut in fixed relation to a bolt, and transverse ridges provided with sharp edges on opposite sides of the threaded perforation and projecting from the face of the body, adapted to engage a nut and hold the same in fixed relation to the self-locking nut.

3. A self-locking nut comprising in its construction a body having a bolt receiving aperture, a boss projecting beyond an adjacent surface of the body and encircling the aperture, and a helical thread encircling the aperture, said thread comprising convolutions in the body and other convolutions in the boss and located at different distances from each other than are the convolutions in the body for holding said self-locking nut in fixed relation to a bolt, and transverse ridges provided with sharp edges on opposite sides of the threaded perforation and projecting from the face of the body, adapted to engage a nut and hold the same in fixed relation to the self-locking nut.

4. In a device of the class described, the combination of a self-locking nut member comprising in its construction a body having a bolt receiving aperture, a boss projecting beyond an adjacent surface of the body and encircling the aperture, and a helical thread encircling the aperture, said thread comprising convolutions in the main body and other convolutions in the boss located closer together than the convolutions in the body for holding said self-locking nut member in fixed relation to a bolt, transverse ridges provided with sharp edges on opposite sides of the threaded perforation and projecting from one face of the body, adapted to engage a nut and hold the same in fixed relation to the self-locking nut member, a threaded bolt in threaded engagement with said self-locking nut member, and a threaded nut in engagement with the projecting edges of the self-locking nut member and in threaded engagement with the bolt.

5. In a device of the character described, the combination of a self-locking member comprising in its construction a body having a bolt receiving aperture and provided with helical thread portions unequally spaced and adapted to engage the helical thread of a bolt, transverse ribs upon said body provided with sharp edges projecting endwise of the body and adapted to engage a nut for holding the same in fixed relation to the nut lock member, a threaded bolt in threaded engagement with said self-locking nut lock member, and a threaded nut in engagement with the edges of the nut lock member and in threaded engagement with the bolt.

6. In a device of the character described, the combination with a nut, and a self-locking cap nut, said nut and cap nut being provided with alined threaded bolt receiving apertures extending therethrough, the aperture of one of said members being provided with helical threaded portions unequally spaced and adapted to engage the helical thread of a bolt, one of said nut members being provided with means projecting from the face thereof outside of the threaded aperture therein, whereby when the nut members are brought together upon a bolt, the cap nut will be bowed.

DANIEL O. WARD.

Witnesses:
HENRY IRWIN CROMER,
JENNIE L. FISKE.